(No Model.)
J. BENSON.
LIQUID FILTER.
No. 277,203. Patented May 8, 1883.
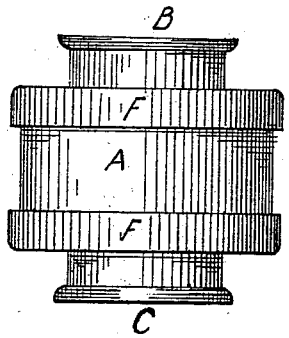
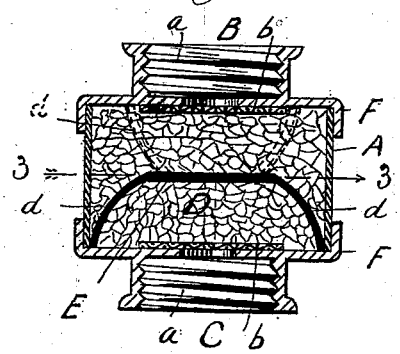
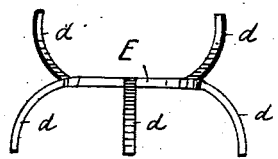
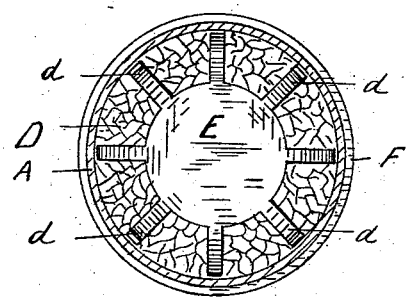
Witnesses
Joseph Benson,
Inventor
per Brown Bros.
Attorneys

UNITED STATES PATENT OFFICE.

JOSEPH BENSON, OF BOSTON, MASSACHUSETTS.

LIQUID-FILTER.

SPECIFICATION forming part of Letters Patent No. 277,203, dated May 8, 1883.

Application filed August 19, 1882. (No model.)

*To all whom it may concern:*

Be it known that I, JOSEPH BENSON, of Boston, in the county of Suffolk and State of Massachusetts, have invented certain new and useful Improvements in Liquid-Filters, of which the following is a full, clear, and exact description.

This improved filter is more especially designed for water, although, as will be plain, it can be used for other liquids.

This improved filter is composed of a case or box open at opposite ends for the passage of water through it, and of granulated corundum and silex, which are confined against escape from the case or box between its opposite open ends, but so that the water to be filtered or other liquid passing through the box will pass through them.

Again, this improved filter is composed of a case or box open at opposite ends for the passage of water through it, and of a suitable filtering substance or substances—such as granulated corundum and silex—which are confined against escape from the case or box between its opposite open ends, but so that the water or other liquid to be filtered passing through the box will pass through them, in combination with a partition which is located and supported within the filtering-chamber of the filter, substantially as hereinafter described, and between its opposite open ends, and intercepts the water in its passage through the filtering-chamber, all in a manner to spread and diffuse the water through the filtering substances before escaping from the filter.

In the accompanying plate of drawings, the present improved filter is illustrated.

Figure 1 is a side elevation. Fig. 2 is a central vertical section; Fig. 3, a horizontal section on line 3 3, Fig. 2; and Fig. 4, a view in detail, as will hereinafter more fully appear.

In the drawings, A represents the case or box of the filter. This case or box is open at its opposite ends, B and C. Each open end of the filter-box A has a screw-threaded socket, *a*, by which to fasten the box in position, and the inner end of each socket *a* is closed by a perforated plate or piece of wire-gauze, *b*.

The chamber of the filter-case A is filled with the filtering substance or substances used, (shown at D,) in the present instance made of granulated corundum and silex in equal or other proper quantities.

E is a partition-plate located within the filtering-chamber of the filter and between its opposite open ends. This partition-plate is of a lesser diameter than the internal diameter of the filter-box, and it has radial legs or prongs *d*, which extend in opposite directions therefrom toward and against the opposite ends or cap-plates, F, of the filter-case. Two, at least, of the legs on opposite sides of the partition rest against the inner periphery of the filter-case. The legs *d* of the partition-plate E, arranged as above described, obviously maintain the plate in its position within the filtering-chamber of the filter, and for the removal and insertion of said plate and the filtering substances, one, at least, of the end or cap-plates F of the filter is to be adapted to be attached to and detached from the body of the filter at pleasure. The partition-plate diverts the water from its direct course through the filtering medium D, which is used, and thus the more evenly and generally distributes it through the filtering medium, improving in a great measure and degree the filtering action of the filter upon the liquid, and all of which is still further increased in effect by the deflecting action of the legs or prongs to the plate upon the course of the water through the filter. The partition-plate E, having its supporting legs or prongs extending in opposite directions, enables the filter to be reversed in its use, the screw-threaded socket *a* at each end being arranged for that purpose.

The advantages of using corundum and silex as the filtering material are that they will not break by the action of the water in passing through the filter, and yet their peculiar fibrous surfaces will retain the particles of dirt, &c., in the water, and therefore these filtering materials are very durable and effectual as a filtering medium.

Having thus described my invention, what I claim, and desire to secure by Letters Patent, is—

1. A liquid-filter composed of a case, A, which is open at opposite ends, B C, and is filled with a filtering medium of granulated corundum and silex, substantially as described.

2. A liquid-filter composed of a case, A, which is open at opposite ends, B C, and provided with a suitable filtering medium, in combination with a partition-plate, E, having radial prongs or legs $d$, extending in opposite directions therefrom, substantially as and for the purpose specified.

In testimony whereof I have hereunto set my hand in the presence of two subscribing witnesses.

JOSEPH BENSON.

Witnesses:
EDWIN W. BROWN,
WM. S. BELLOWS.